United States Patent
Yates et al.

(10) Patent No.: US 9,340,299 B2
(45) Date of Patent: May 17, 2016

(54) LONG RANGE ELECTRIC AIRCRAFT AND METHOD OF OPERATING SAME

(71) Applicants: William M. Yates, Aliso Viejo, CA (US); Robert Ussery, Newport Beach, CA (US); Byron Young, Lafayette, CO (US)

(72) Inventors: William M. Yates, Aliso Viejo, CA (US); Robert Ussery, Newport Beach, CA (US); Byron Young, Lafayette, CO (US)

(73) Assignee: W. MORRISON CONSULTING GROUP, INC., Aliso Viejo, CA (US)

(*) Notice: Subject to any disclaimer, the term of this patent is extended or adjusted under 35 U.S.C. 154(b) by 369 days.

(21) Appl. No.: 13/852,315

(22) Filed: Mar. 28, 2013

(65) Prior Publication Data

US 2014/0339371 A1    Nov. 20, 2014

Related U.S. Application Data

(60) Provisional application No. 61/618,482, filed on Mar. 30, 2012.

(51) Int. Cl.
*B64D 39/00* (2006.01)
*B64D 27/24* (2006.01)
*B64C 39/02* (2006.01)

(52) U.S. Cl.
CPC .............. *B64D 39/00* (2013.01); *B64C 39/024* (2013.01); *B64D 27/24* (2013.01); *B64C 2201/021* (2013.01); *B64C 2201/042* (2013.01); *B64C 2201/066* (2013.01); *B64C 2201/104* (2013.01); *B64C 2201/127* (2013.01); *B64C 2201/146* (2013.01); *B64C 2201/187* (2013.01)

(58) Field of Classification Search
CPC .............. B64D 39/00; B64C 2201/06; B64C 2201/063; B64C 2201/066; B64C 37/02
See application file for complete search history.

(56) References Cited

U.S. PATENT DOCUMENTS

| | | | |
|---|---|---|---|
| 6,540,179 B2 * | 4/2003 | Henderson | 244/135 A |
| 6,819,982 B2 * | 11/2004 | Doane | B64C 13/20 |
| | | | 244/135 A |
| 7,798,449 B2 * | 9/2010 | Small et al. | 244/135 A |
| 8,056,860 B2 * | 11/2011 | Small et al. | 244/135 A |
| 8,540,183 B2 * | 9/2013 | Morris et al. | 244/1 TD |
| 8,639,395 B2 * | 1/2014 | Hudson | 701/3 |
| 2002/0074454 A1 * | 6/2002 | Henderson | 244/135 A |

(Continued)

FOREIGN PATENT DOCUMENTS

FR    3000029 A1 * 12/2012

OTHER PUBLICATIONS

UAV Battery Packs Could Allow Electric Planes to Fly Forever Ackerman, Evan. Jul. 12, 2012, IEEE Spectrum http://spectrum.ieee.org/automaton/robotics/industrial-robots/uav-battery-packs-could-allow-electric-planes-to-fly-forever.*

*Primary Examiner* — Joseph W Sanderson
(74) *Attorney, Agent, or Firm* — Dentons US LLP

(57) ABSTRACT

Electric aircraft, including in-flight rechargeable electric aircraft, and methods of operating electric aircraft, including methods for recharging electric aircraft in-flight, through the use of an unmanned aerial vehicle (UAV) flying independent of and in proximity to the electric aircraft. The electric aircraft and methods of operating and recharging same may involve establishing, in-flight, an electrical connection between the aircraft and the UAV flying in proximity to the aircraft and transferring electricity from an electricity source associated with the UAV to the aircraft through the electrical connection.

17 Claims, 13 Drawing Sheets

(56) References Cited

U.S. PATENT DOCUMENTS

| | | |
|---|---|---|
| 2002/0190162 A1 | 12/2002 | McDonnell |
| 2004/0102876 A1* | 5/2004 | Doane .................... B64C 13/20 701/9 |
| 2006/0000949 A1* | 1/2006 | Schroeder ............. B64D 39/00 244/135 A |
| 2006/0000950 A1* | 1/2006 | Von Thal et al. .......... 244/135 A |
| 2007/0023575 A1* | 2/2007 | von Thal et al. .......... 244/135 A |
| 2008/0184906 A1 | 8/2008 | Kejha |
| 2009/0045290 A1* | 2/2009 | Small et al. ............... 244/135 A |
| 2010/0025523 A1* | 2/2010 | Kutzmann et al. ................ 244/2 |
| 2010/0213318 A1* | 8/2010 | Hudson .................... 244/135 A |
| 2010/0321011 A1* | 12/2010 | Small et al. .................... 324/239 |
| 2011/0139928 A1 | 6/2011 | Morris |
| 2012/0168564 A1* | 7/2012 | Feldmann et al. ........ 244/135 A |
| 2012/0234964 A1* | 9/2012 | Heppe ............................. 244/2 |

* cited by examiner

LONG RANGE ELECTRIC AIRCRAFT AND METHOD OF OPERATING SAME

RELATED APPLICATION

This application claims priority to U.S. provisional patent application Ser. No. 61/618,482 filed Mar. 30, 2012, which is herein incorporated by reference in its entirety.

FIELD OF THE INVENTION

The present invention relates to aircraft that operate on electric power. More specifically, the present invention relates to electric aircraft, and methods of operating electric aircraft that have long range capabilities.

BACKGROUND OF THE INVENTION

Electric aircraft have significant advantages over fossil-fuel powered conventional aircraft. For example, electric aircraft can achieve the same horsepower at any altitude, whereas fossil-fuel powered aircraft lose substantial power at higher altitudes due to low oxygen levels. Electric aircraft are capable of generating instantaneous torque at low RPM. Still further, electric aircraft have zero emissions, a low noise output, and low heat generation, all of which are particularly advantageous in military applications, where low noise and heat levels in particular enhance the stealthy characteristics of the aircraft, thus allowing the aircraft to more effectively avoid enemy detection and attack.

Civilian and commercial operators also benefit from the advantages associated with electric aircraft. For example, electric aircraft are upwards of 90 percent efficient, compared to fossil-fuel powered aircraft which are roughly 35 percent efficient. Thus, electric aircraft may be less expensive to operate than fossil-fuel powered aircraft, especially in light of the ever increasing cost of fossil fuels. As stated above, electric aircraft have zero emissions and a low noise output. Electric aircraft are, therefore, environmentally friendly. This alone has the potential of opening up new flight operation opportunities in noise abatement zones and environmentally protected areas as well as complying with future pollution and emissions mandates.

Of course, there are drawbacks associated with electric aircraft, particularly electric aircraft that operate on battery power. The primary drawback is range. An electric aircraft operating on battery power is severely limited in range, that is, the distance an aircraft can travel without having to land and refuel, or recharge in the case of electric aircraft. This problem is primarily due to limitations associated with the current state of battery technology.

Current state of the art batteries have very low energy densities compared to, for example, gasoline. Indeed, the large energy density gap between fossil fuels and batteries is impeding the widespread adoption of electric vehicles, including electric aircraft. Present state of the art electric aircraft are barely able to achieve ranges of 200-300 miles before having to land for a long period of time to recharge the onboard battery.

Electric automobiles (including hybrid automobiles) are designed to recapture braking energy. Kinetic Energy Recover Systems (KERS) are known in the art and used for recapturing the braking energy of a ground vehicle in order to partially recharge the battery during use. This, in turn, increases the number of miles electric automobiles, motorcycles, and other such ground vehicles can travel without recharging. Although it is possible that some energy could be recovered by an electric airplane such as during descent, electric aircraft do not have the same level of braking energy to recapture; thus, electric aircraft have not been able to achieve acceptable range compared with their fossil fuel powered counterparts, the same way electric cars are beginning to achieve some level of acceptable range compared with their fossil fuel powered counterparts.

Another drawback associated with electric aircraft is cost. Current state of the art batteries are very expensive. Moreover, manufacturers of electric airplanes typically utilize the best batteries on the market in order to realize the best possible range performance. These batteries are naturally the most expensive batteries and in some cases, are more prone to failures and safety concerns such as onboard fires.

On a positive note, battery technology is rapidly improving. However, it is not improving at a rate that is likely to allow electric airplanes to achieve any sort of performance parity with gasoline or jet fuel powered counterparts, and become a practical reality, any time in the near future. Accordingly, what is needed is an electric aircraft and/or a method of operating an electric aircraft that is capable of meeting or exceeding the range performance of gasoline or jet fuel aircraft, without a complete reliance on battery technology to close the range gap.

SUMMARY OF THE INVENTION

The present invention obviates the aforementioned drawbacks and deficiencies associated with conventional electric aircraft due to limitations in range caused by the low energy densities of even the best state of the art batteries. In general, the present invention is able to meet or exceed the range performance of gasoline or jet fuel aircraft and, therefore, eliminate "range anxiety," by employing one or more batteries that, in-flight, are jettisoned or otherwise separated from the aircraft when their electric charge has been depleted, or by employing batteries that are configured to fly, independent of the electric aircraft, for example, in the form of an unmanned aerial vehicle (UAV), as well as rendezvous with and dock with the electric aircraft in order to replace charge depleted batteries, including charge depleted batteries that have been jettisoned or otherwise separated from the aircraft, or in the alternative, connect with the electric aircraft and perform in-flight recharging. It will be understood that the batteries may be jettisoned, in-flight, if and when it is determined that the electric charge falls below a predefined threshold other than total electric charge depletion, as there may be situations where it is more efficient to jettison a battery before all of the electric charge is depleted. However, for ease of discussion purposes only, the present specification will use electric charge depletion as the threshold.

One objective of the present invention is to provide an electric aircraft capable of flying greater ranges than conventional electric and/or fossil fuel powered aircraft.

Another objective of the present invention is to provide an electric aircraft capable of flying greater ranges at less cost than conventional electric and/or fossil fuel powered aircraft.

Still another objective of the present invention is provide an environmentally friendly electric aircraft that is attractive to customers and consumers, so that environmentally friendly electric aircraft are more widely employed, thereby reducing dependence on fossil fuel powered aircraft.

Thus, in accordance with one aspect of the present invention, the above-identified and other objectives are achieved by an electric aircraft comprising a propulsion system powered at least in part by electricity and a battery capable of maintaining an electric charge for providing power to the propulsion system. The electric aircraft also comprises a connection configured to transfer electricity from a UAV pack during flight, wherein the UAV pack is flying in proximity to the aircraft.

In accordance with another aspect of the present invention, the above-identified and other objectives are achieved by a UAV pack comprising a propulsion system and an electricity source. The electricity source is configured for transferring electricity, in-flight, to an aircraft having a propulsion system that is, at least in part, powered by electricity, when the UAV pack is flying in proximity to the aircraft.

In accordance with still another aspect of the present invention, the above-identified and other objectives are achieved by an in-flight charging method for an aircraft having an electrically powered propulsion system and at least one battery. The method comprises establishing, while in-flight, an electrical connection between the aircraft and a UAV pack flying in proximity to the aircraft. The method also involves transferring electricity from an electricity source associated with the UAV pack to the aircraft through the electrical connection.

BRIEF DESCRIPTION OF THE DRAWINGS

Several figures are provided herein to further the explanation of the present invention. More specifically.

DETAILED DESCRIPTION

Figure 1:
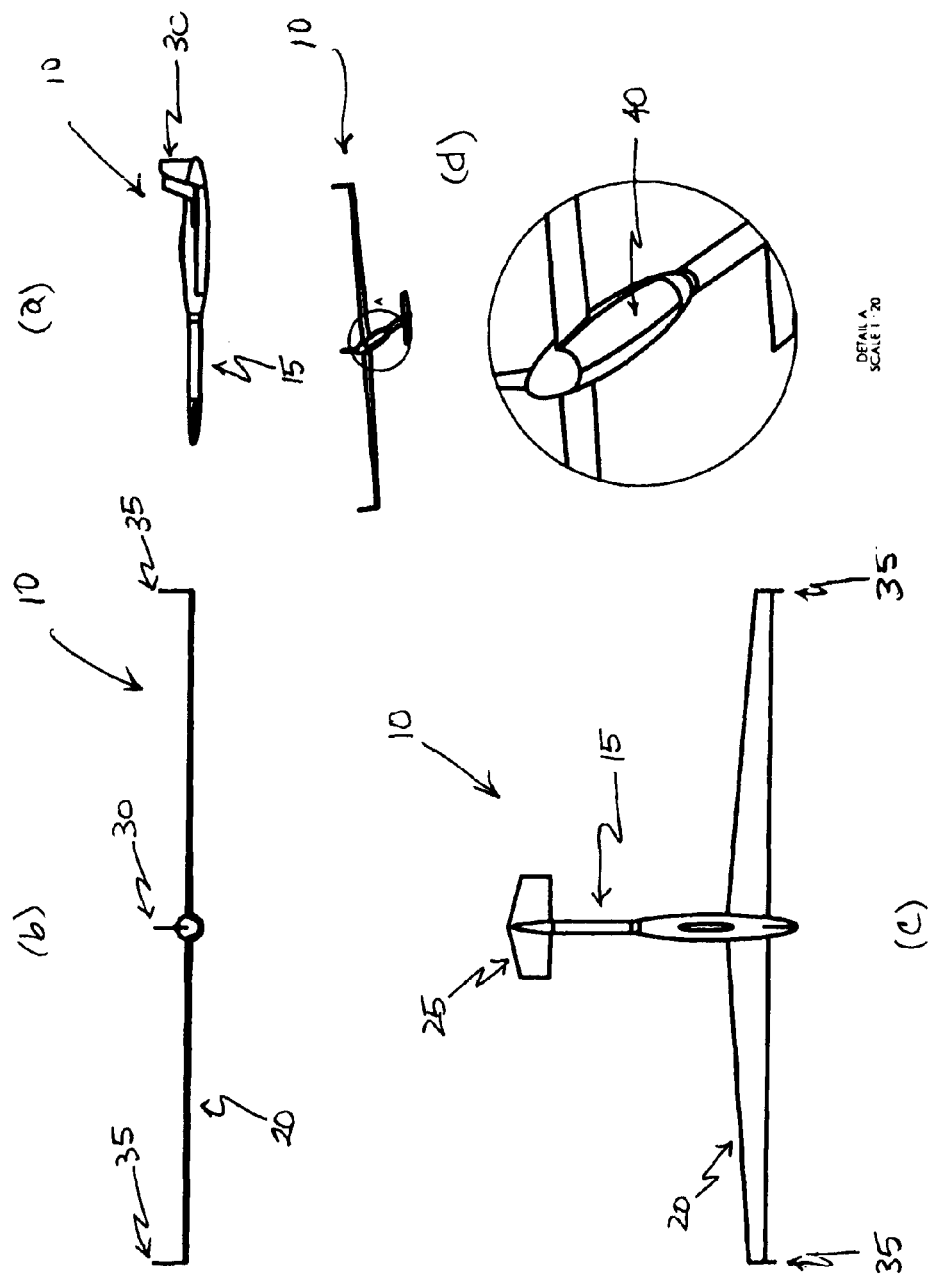
FIG. 1 illustrates an exemplary configuration, in accordance with a first exemplary embodiment of the present invention, where one or more battery packs are internally located with respect to the mothership.

It is to be understood that both the foregoing general description and the following detailed description are exemplary. As such, the descriptions herein are not intended to limit the scope of the present invention. Instead, the scope of the present invention is governed by the scope of the appended claims.

The present invention covers electric aircraft, hybrid-electric aircraft, and methods of operating such electric and hybrid-electric aircraft that employ one or more batteries that, in-flight, are jettisoned or otherwise separated from the aircraft when their electric charge is depleted. The present invention also covers electric aircraft and methods of operating electric aircraft that employ one or more batteries that are configured to fly, independent of the electric aircraft, and thus have the capability to take off, rendezvous with and dock with the electric aircraft. In accordance with at least one exemplary embodiment below, batteries configured to fly, independent of the electric aircraft, may be employed to replace charge depleted batteries, including charge depleted batteries that have been jettisoned or otherwise separated from the electric aircraft.

Although it will be apparent from the detailed description below, the general principles of the present invention are not limited to 100 percent battery powered electric aircraft and methods of operating such battery powered electric aircraft. In fact, the general technical principles of the present invention as set forth herein below can be applied to aircraft employing energy sources such as solar, fuel cells and hybrid electric aircraft that may also include an internal combustion or turbine power plant or generator on board. For the purposes of this disclosure, the term "electric aircraft" shall be taken to include aircraft that have at least one battery and at least one electric motor as any portion of their propulsion design, such as all-electric, hybrid-electric (including internal combustion and turbines), solar, fuel cell and other forms of electrically powering an electric motor. Nevertheless, the detailed description presented below focuses on electric aircraft and methods of operating electric aircraft.

Three exemplary embodiments of the present invention are described herein. The first exemplary embodiment involves battery packs that separate and drop away from the electric aircraft, while the electric aircraft is in-flight. The second and third exemplary embodiments both involve battery packs, which take the form of an unmanned aerial vehicle (UAV). For ease of discussion, and to more clearly distinguish between an electric aircraft and a UAV, which may, in its own right be electrically powered and capable of flying independent of the electric aircraft, electric aircraft are referred to herein as the "mothership."

In the first exemplary embodiment, the mothership employs one or more battery packs that separate and drop away from the mothership, while the mothership is in-flight, when the electric charge associated with each of the one or more battery packs is depleted. By releasing the one or more battery packs, the range of the mothership may be significantly extended. As one skilled in the art will readily appreciate, aircraft range is highly dependent on the gross weight of the aircraft. Thus, shedding the weight of the one or more battery packs, while the mothership is in-flight, will allow the mothership to fly more efficiently, that is, to fly greater distances on the same amount of electric charge.

Figure 11:
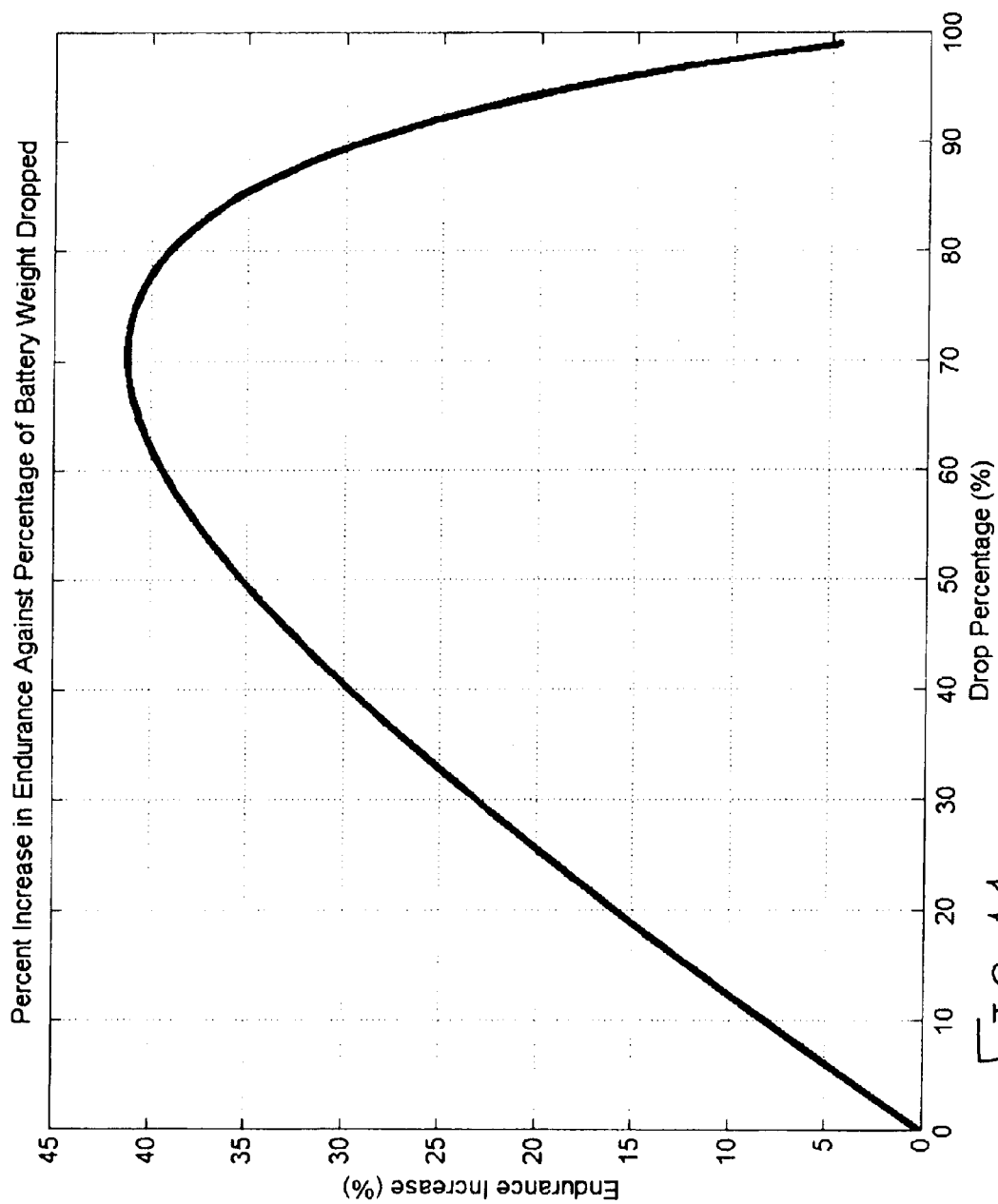
FIG. 11 is a graph illustrating the relationship between the percentage of aircraft gross weight dropped and the corresponding percentage improvement in range.
Figure 12:
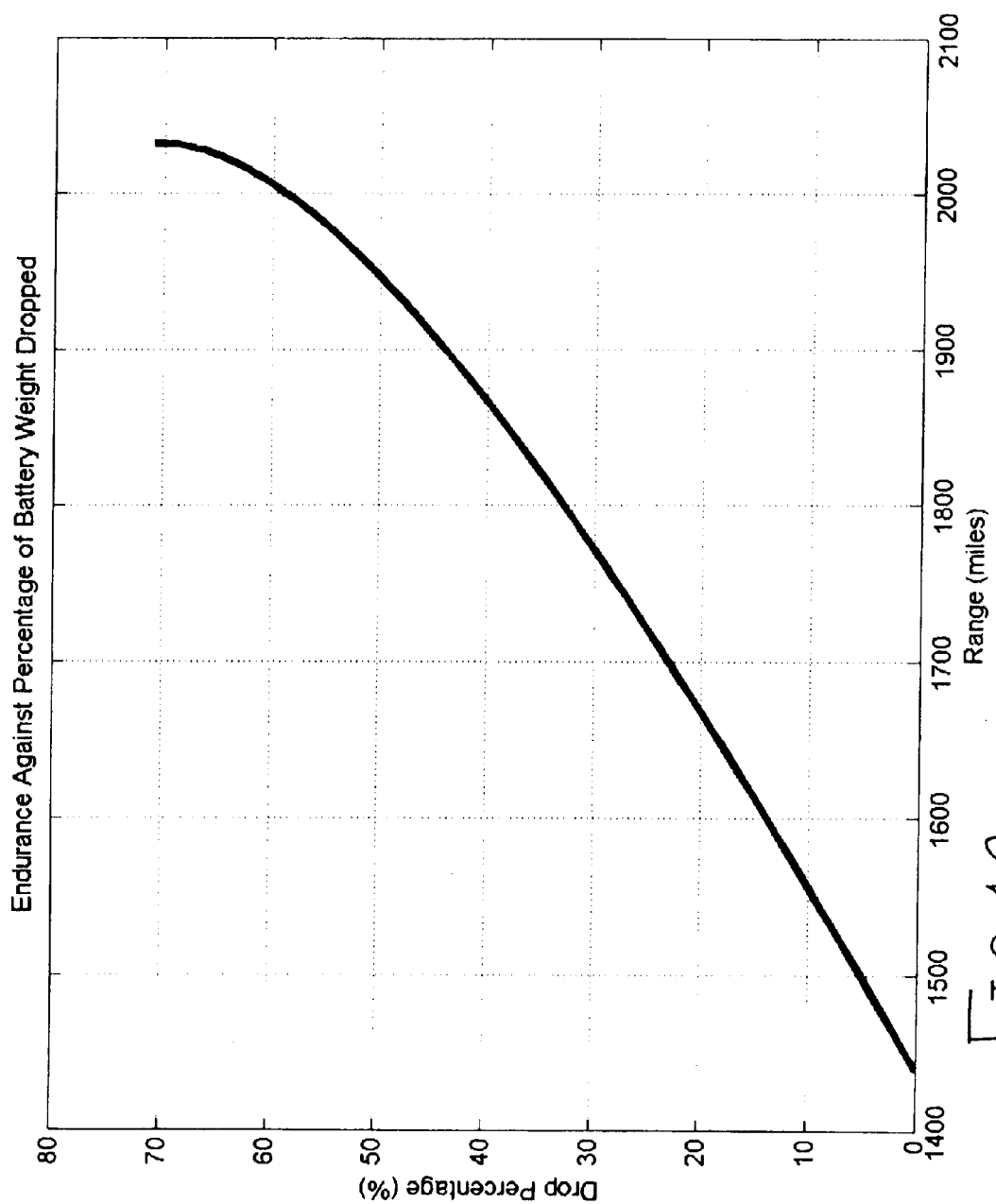
FIG. 12 is a graph illustrating the relationship between the percentage of aircraft gross weight dropped and the corresponding mileage improvement in range.
Figure 13:
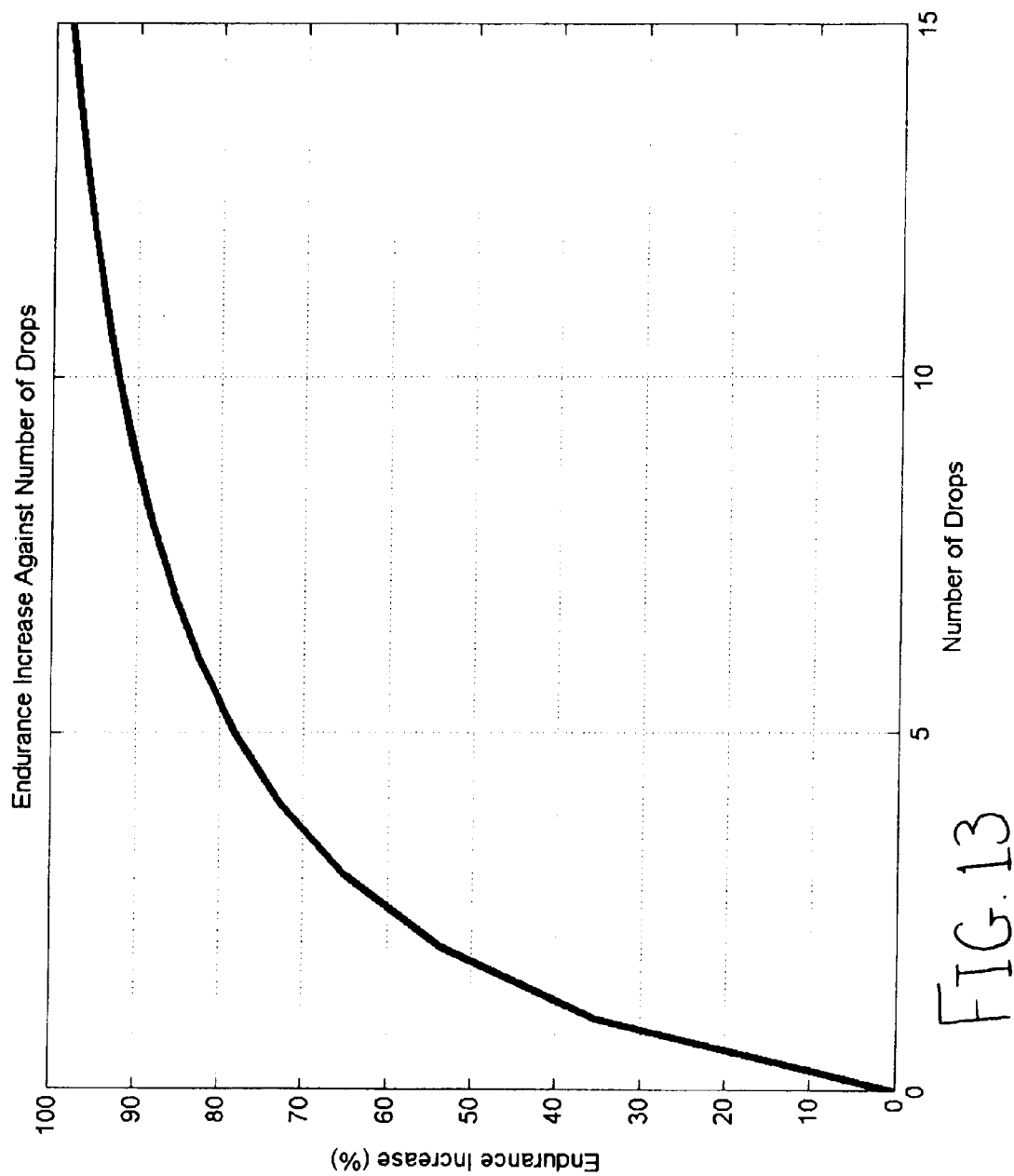
FIG. 13 is a graph illustrating the relationship between the number of battery drops and the corresponding percentage improvement in range.

FIGS. 11-13 reflect analysis that demonstrates how range is significantly improved by shedding weight in-flight, in accordance with exemplary embodiments of the present invention, and how range is even further improved if the shedding of weight is broken up into multiple events over the course of the flight, as opposed to shedding the same total amount of weight in a single event. Referring to FIG. 11 in particular, the analysis indicates that if the mothership sheds, for example, 70 percent of its gross weight in-flight due to the jettisoning of one or more battery packs in a single event (e.g., multiple battery packs or UAV packs simultaneously), it is estimated that the mothership may extend its range by approximately 42 percent. FIG. 12 illustrates that the approximately 42 percent increase in range translates into over 2000 miles for a mothership that has a range of 1,450 miles with no battery packs being dropped. FIG. 13 illustrates that performing a greater number of drops involving lighter battery packs, compared to fewer drops involving heavier battery packs, further enhances the benefit of the present invention, that is, by doing so, the range of the mothership is significantly extended. More specifically, with reference to FIG. 13, if the mothership drops five battery packs during the flight, the range would be extended approximately 78% compared to the same mothership making no drops along the same route. However, if ten drops are made, instead of five drops, but involving the same amount of total weight loss, the mothership would realize an approximately 92% improvement in range.

Figure 2:
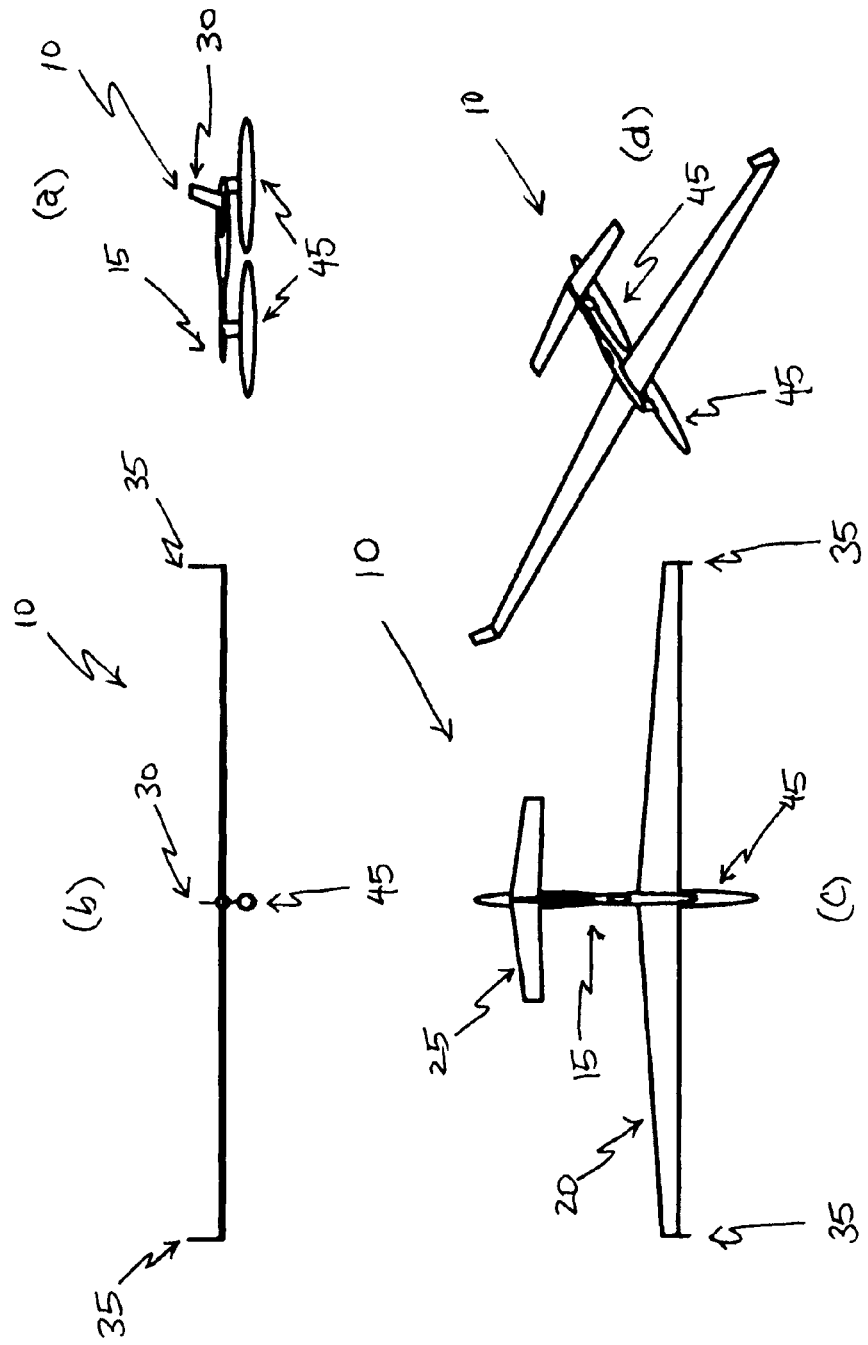
FIG. 2 illustrates an exemplary configuration, in accordance with a first exemplary embodiment of the present invention, where one or more battery packs are located in pods which are, in turn, externally located with respect to the mothership.
Figure 3:
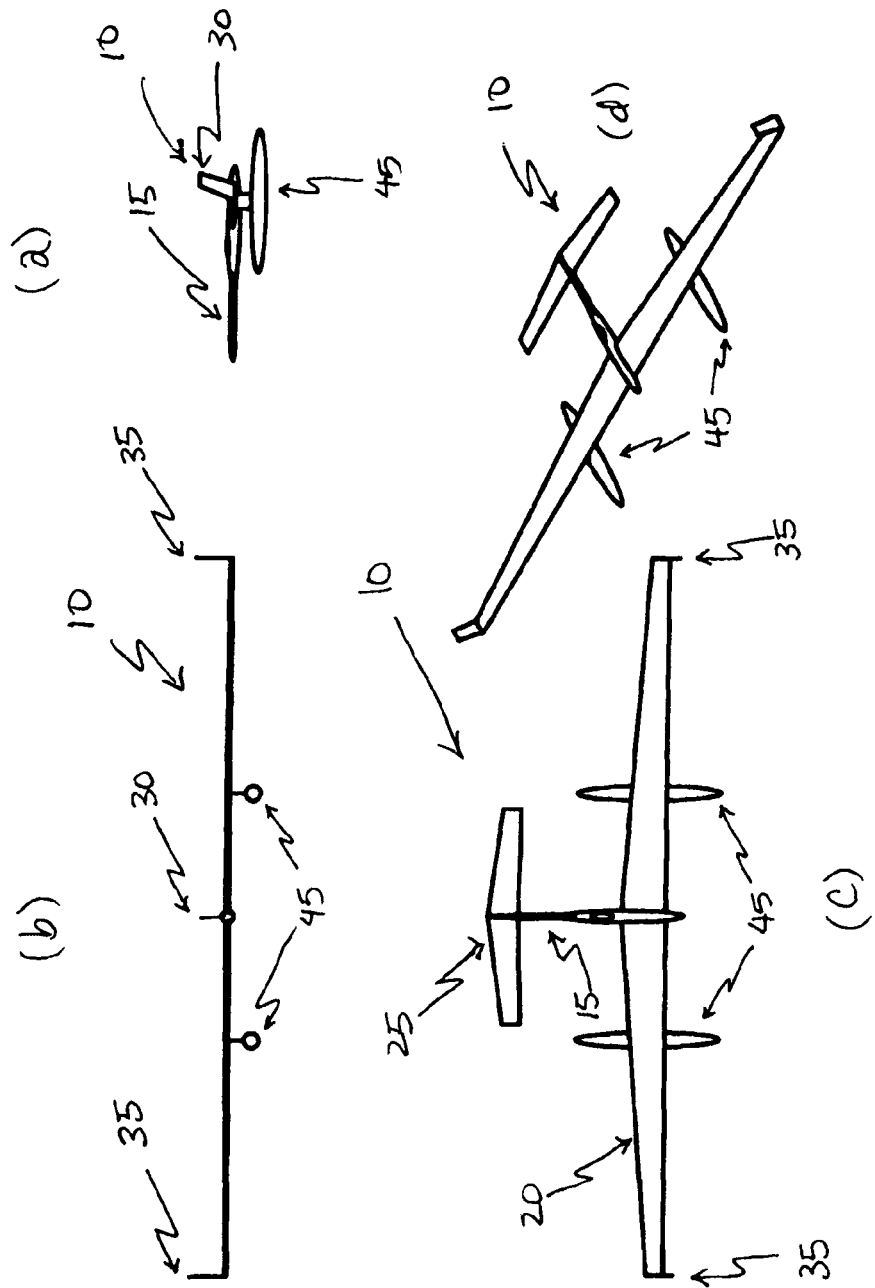
FIG. 3 illustrates another exemplary configuration, in accordance with a first exemplary embodiment of the present invention, where one or more battery packs are located in pods which are, in turn, externally located with respect to the mothership.

The one or more battery packs may be located on the interior or the exterior of the mothership, as illustrated by the exemplary configurations of FIGS. 1-3. In each of these figures, a mothership 10 is depicted along its pitch (a), roll (b) and yaw (c) axes. Additionally, each of these figures provides a perspective view (d), further illustrating either an internal or an external configuration for the one or more battery packs. More specifically, in FIGS. 1-3, mothership 10 has a fuselage 15, main wings 20, forward wings (also known as a Canard wing) 25 and a vertical stabilizer 30. As shown, each of the main wings 20 comprises a wingtip device 35. These are typically provided to increase the efficiency of the aircraft by smoothing the airflow over the upper surface of the wing near the wingtip, thereby reducing lift-induced drag caused by wingtip vortices and increasing fuel efficiency and range, as is well known in the art. As increased efficiency and range are objectives of the present invention, mothership 10 is illustrated with wingtip devices 35, although it will be understood that such devices are optional.

FIG. 1 illustrates an exemplary configuration, where the one or more battery packs are internal to mothership 10. In this exemplary configuration, mothership 10 includes one or more doors 40 associated with the underside of fuselage 15, as illustrated in FIG. 1(d). The one or more doors 40 open to a bay or compartment in fuselage 15. In this exemplary configuration, the one or more battery packs are discreetly located inside the bay or compartment. When the mothership 10 determines that the charge associated with a first one of the one or more battery packs is depleted, the mothership 10 opens the doors 40, thereby exposing the bay or compartment where the one or more battery packs are located. The mothership 10 then disconnects the charge depleted battery pack electrically as well as mechanically, and jettisons the battery pack so that it drops out of the bay or compartment and away from the mothership 10. It will be understood that this sequence may be repeated as the charge associated with each of the remaining battery packs becomes depleted. It should be further noted that in accordance with a preferred embodiment, the disconnection and subsequent jettison of each battery pack should not result in any net force about the roll axis as the battery packs are located along the centerline of the mothership 10. Each jettison of a charge depleted battery pack could, however, cause a change in the center of gravity (CG) of the mothership 10, which can be compensated for by a coordinated movement of any remaining battery packs to center their remaining mass at the desirable CG point for the aircraft. Alternately, the mothership 10 may be required to make trim adjustments to its flight control surfaces to account for the change in CG in order to maintain level flight, as one skilled in the art will readily appreciate.

Each battery pack will be connected to the mothership, electrically as well as mechanically, inside the bay or compartment, as mentioned above. The mechanism that is employed to secure and subsequently jettison each battery pack may involve any of a number of design configurations.

In one embodiment, the battery packs are mounted along a rail system in a collinear arrangement. The rails may be round and conductive so as to provide at least three desirable features: (i) securing the battery packs inside the aircraft, (ii) allowing the battery packs to be slidably engaged and moved linearly along the rail system during jettison and rebalancing operations, and (iii) to serve as electrical conductors to convey electrical power from the battery packs mounted thereto, to the electric motor control system of the aircraft.

Figure 10:
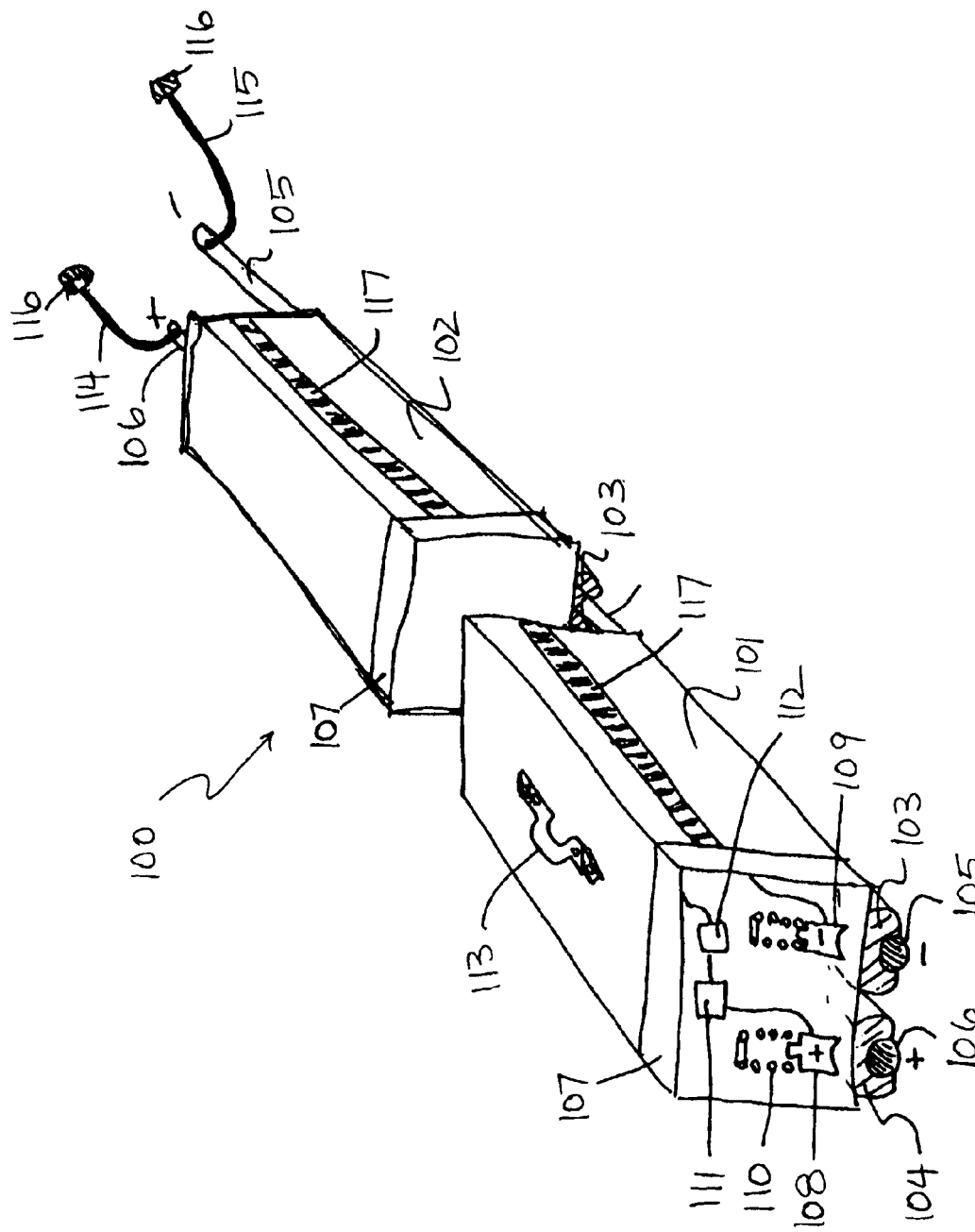
FIG. 10 illustrates a battery pack securing mechanism in accordance with a preferred embodiment of the present invention.

FIG. 10 illustrates an exemplary battery mounting linear sliding rail system 100 with provisions for the shuttling and jettisoning of battery packs. For purposes of illustration, two complete battery packs 101 and 102 are shown, slidably engaged to the linear sliding rail system 100. Battery pack 101 and battery pack 102 are comprised of a plurality of interconnected batteries such as lithium-ion polymer batteries (not shown) and feature linear sliding bearings 103 and bearings 104 on the underside, known to those skilled in the art as linear pillow block bearings. Bearings 103 and 104 are slidably engaged to rails 105 and 106, which are preferably constructed of an electrically conductive material to convey electrical power from the battery packs to the electric motor control system, and more generally, the mothership's propulsion system.

Attached to the front of battery pack 101 and the front of battery pack 102 is an integral battery management system (BMS) area 107 which houses ancillary electronics necessary and desirable for the functionality of battery packs 101 and 102. Inside BMS area 107 are electrical brushes 108 and 109. Each of the electrical brushes 108 and 109 feature one end having a semi-round concave shape to matably engage rails 106 and 105, respectively, through an opening in the bottom of BMS area 107 (not shown). Brushes 108 and 109 are forced into contact with rails 106 and 105 by a spring 110, as is known to those skilled in the art of electric motor brushes and electrical power transmission. Brushes 108 and 109 are made from a conductive material such as carbon and are electrically connected to the positive and to the negative terminals of the battery packs 101 and 102. Alternately, brushes 108 and 109 may be constructed from other conductive materials such as copper, may be integral to bearings 103 and 104, and may or may not be spring loaded. For ease of illustration, FIG. 10 shows the brushes 108 and 109 slightly retracted and hovering above rails 106 and 105, though in operation, it is to be understood that they would be in contact and slidably engaged with rails 106 and 105. The semi-round concave shape of the brushes may be other shapes so long as they are dimensionally similar to the corresponding mating shape of rails 106 and 105. Electrical continuity (i.e., between the battery pack and the mothership's propulsion system) may be selectably enabled by the user or by an automated system via known means in the art such as by an electrical contactor 111. For safety purposes, a fuse 112 may also be installed in either or both of the positive and negative electrical paths. Also inside BMS area 107 is a battery management system (not shown) that includes provisions for individually monitoring the voltage of each individual battery cell inside the battery pack (not shown).

In certain embodiments where battery packs are not intended to be connected electrically in parallel, it is preferable not to have more than one battery pack completely electrically connected to linear slides 105 and 106 because different battery packs at different states of charge (SOC) should not generally be connected together in parallel without prior accommodations and precautions being taken. In a preferred embodiment, the battery packs are not connected together electrically in parallel so that the aircraft is running on one battery pack at a time, which becomes depleted and ready for jettisoning more immediately than if multiple battery packs are connected in parallel and depleted as a larger capacity group more slowly. The benefit to depleting smaller packs more quickly is that the weight of the depleted packs may be jettisoned more immediately and more frequently during a route of flight, resulting in a longer flight range due to reduced airframe mass as described above and as illustrated in FIG. 13. Accordingly, contactor 111 is inserted into the positive electrical path, as shown in FIG. 10, in order to interrupt the electrical connection when battery pack 101 is designated as "offline" prior to use or just after use. The negative side may remain connected to the rail 105 without the use of a contactor because electricity will not flow from the battery pack 101 if the contactor 111 is in the open position, however, a negative leg contactor may be used. When the battery pack 101 is ready to be placed online in order to provide electric charge for the mothership's propulsion system, a user or the aircraft battery control software will command the contactor 111 to close, and power from the battery pack 101 will flow through the brushes 108 and 109, onto the rails 106 and 105, and via electrical cables or other appropriate conduits 114 and 115 to be connected to the mothership's propulsion system via optional connectors 116.

Further in accordance with the embodiment illustrated in FIG. 10, the battery mounting linear sliding rail system 100 is activated in response to a command signal provided by the mothership, upon determining that the electric charge associated with a given one of the battery packs has been depleted, so as to first electrically disconnect the battery pack by opening the contactor 11 and then jettison the charge depleted battery pack, thus allowing the battery pack to drop away from the mothership as described above. A secure mounting point 113 can be used to attach a parachute or other like device to assist with the jettison operation. A linear gear rack 117, known to those skilled in the art of motion control, can be attached to one or more sides of the battery packs 101 and 102 for the purpose of engaging a motor driven round gear (not shown) that will move battery packs 101 and 102 forward and/or backward linearly along rails 105 and 106 for the purposes of jettisoning or repositioning remaining battery packs for optimum aircraft center of gravity trim balance as part of an onboard Jettison and Balance System (JBS).

The JBS includes an indication of aircraft pitch such as from an onboard Attitude Heading and Reference System (AHRS) as well as information from the onboard Aircraft Control Software (ACS) such as battery pack State of Charge (SOC), flight information, pilot control stick inputs, location of the next jettison drop, aircraft weight and balance and other such information to inform the jettison timing and movement of remaining battery packs onboard the aircraft. The ACS manages the battery packs and jettisoning system. The ACS is in electrical communication with each of the battery packs, the JBS, the flight controls, and the navigation information for the route of flight. Using these and other inputs, the ACS determines when a battery pack has become depleted and sends a signal to the depleted battery pack to open its contactor 111 thereby electrically isolating it from the rail 106. The ACS then sends a signal to the next fully charged battery pack in line to close its contactor 111 thereby allowing the battery pack voltage to become available on rail 106 to provide electrical power for the mothership's propulsion system. To avoid electrical surges or spikes during the transition period of isolating a depleted battery pack and connecting a freshly charged battery pack, it may be desirable to use a circuit containing a resistor to prevent a fast inrush of current from the fresh battery pack to the electric motor controller. Such circuits are known to those skilled in the art of electric motor controllers as "Soft-Start Circuits". Other techniques such as using a capacitor or other battery pack to hold the voltage to the electric motor constant, and prevent loss of power to the propeller during changeover periods may be used. Concurrently, the ACS also compares the aircraft's present position and route of flight to determine if and when the recently depleted battery pack should be jettisoned. When the ACS determines that a jettison operation should occur, it sends a signal to the JBS, which opens a hatch if so equipped, operates the motor driven round gear (not shown) to linearly slide and then jettison the depleted battery pack out of the aircraft while simultaneously repositioning the remaining battery packs along rails 105 and 106 to rebalance the aircraft as desired. It is to be understood that the functionality of the JBS, ACS and AHRS, which is separately explained herein for clarity, may be combined into a single piece of hardware and/or software by a person practicing the present invention. During the jettison process, a parachute may be employed that is pre-connected to each battery pack or that is connected just prior to the jettisoning action. The parachute may be triggered by a ripcord attached to the mothership or by a timed deployment device integral to the parachute, or by other such means as are known to those skilled in the art of cargo parachuting operations. One source of such cargo aerial delivery parachutes is Airborne Systems of North America.

FIGS. 2-3 illustrate exemplary configurations, where the one or more battery packs are located externally with respect to mothership 10. More specifically, in each of these exemplary configurations, the one or more battery packs are located in pods 45, suspended from or otherwise attached to mothership 10.

In FIG. 2, the one or more pods 45 are suspended from the underside of the fuselage 15. As shown, this exemplary configuration reflects an inline arrangement. Thus, as the electric charge associated with a first battery pack is depleted, a door or doors (not shown) associated with the corresponding pod 45 open, and the charge depleted battery pack is disconnected, electrically and mechanically, and then jettisoned so that it can drop away from the mothership 10, in the same or similar manner described above with respect to the exemplary configuration illustrated in FIG. 1. Again, this process may be repeated as the charge associated with each of the remaining battery packs becomes depleted. Alternatively, each pod 45 may be disconnected, electrically and mechanically, and jettisoned so that it may drop away from the mother ship 10 when all of the battery packs located therein are depleted of charge.

In the case where the entire pod is configured to be jettisoned, it may be desirable to connect any battery packs internal to the pod together as one essentially large battery pack.

The reason being, is that the pod is not likely to be jettisoned until all of the battery packs internal to the pod are depleted of electric charge. Thus, in this instance, it may be less advantageous to have a plurality of sequentially utilized battery packs inside the pod It should be noted that this inline arrangement may be beneficial in that the disconnection and subsequent jettison of each battery pack or pod 45 should not cause any net force about the roll axis as the battery packs and pods are located along the centerline of the mothership 10. However, as explained above, each jettison of a charge depleted battery pack or the jettison of a pod 45 could potentially cause a change in the CG of the mothership 10. Thus, the mothership 10 might may be required to either reposition the remaining battery packs with the rail mounting system described above, reposition the remaining pod or pods forward or backward along a rail mounting system similar to that described above, or make trim adjustments to account for changes in CG in order to maintain level flight.

In FIG. 3, one or more pods 45 are suspended from the underside of each main wing 20. In this exemplary configuration, the pods 45 are positioned symmetrically, on either side of the longitudinal axis of the mothership 10, not inline along the longitudinal axis, like the exemplary embodiment illustrated in FIG. 2. Accordingly, the jettison of a charge depleted battery pack or the jettison of an entire pod 45 from under one of the main wings would preferably, though not necessarily, coincide with the jettison of a charge depleted battery pack or an entire pod 45, respectively, from under the other main wing. The reason for this would be to prevent any net force about the roll axis. As stated above with respect to the exemplary embodiments illustrated in FIGS. 1-2, the jettison of each charge depleted battery pack or the jettison of a pod 45 could potentially cause a change in the CG of the mothership 10. Thus, the mothership 10 may be required to either reposition the remaining battery packs with the rail mounting system described above, or make trim adjustments to account for changes in CG in order to maintain level flight. In the case where the entire pod is being jettisoned, it may desirable to connect any battery packs internal to the pod together as essentially one large battery pack. Furthermore, in the case of underwing pods that are desirable to jettison as a pair to prevent any net force about the roll axis, the battery packs in both pods may be electrically wired together in parallel to form essentially one large battery pack spread across two or more underwing pods that are jettisoned simultaneously.

In the exemplary configurations of FIGS. 2-3, mothership 10 is illustrated as having two pods 45. It will be understood, however, that the mothership 10 may have more or less than two pods 45. With specific regard to the exemplary configuration of FIG. 3, however, it is preferable, though it is not necessary, that there be an even number of pods 45, with the same number of pods 45 on both sides of the longitudinal axis, in order to maintain a symmetric configuration.

The battery packs and/or pods that are jettisoned may be discarded. However, it is preferable, and certainly more environmentally friendly, to recover and reuse the battery packs and pods. In order to recover and reuse the battery packs and pods, any number of techniques are possible. For example, each battery pack or pod may be equipped with a parachute as previously described. Additionally, dye markers or transponders may be employed to assist in locating the battery packs or pods which could be jettisoned over remote locations, such as an ocean or a desert, or over predetermined battery collection centers strategically located on the ground along popular routes of flight. Alternatively, the battery packs or pods may be equipped with a steerable parachute for controlled descent to a predetermined location for recovery and reuse via a cargo aerial delivery parachute such as those manufactured by Airborne Systems of North America.

The second and third exemplary embodiments, unlike the first exemplary embodiment, involve one or more battery packs that comprise wings, for example, battery packs that take the form of a UAV. For the purpose of convenience only, these battery packs are referred to herein as UAV packs. FIGS. 4-8 illustrate various exemplary configurations involving UAV packs.

Figure 4:
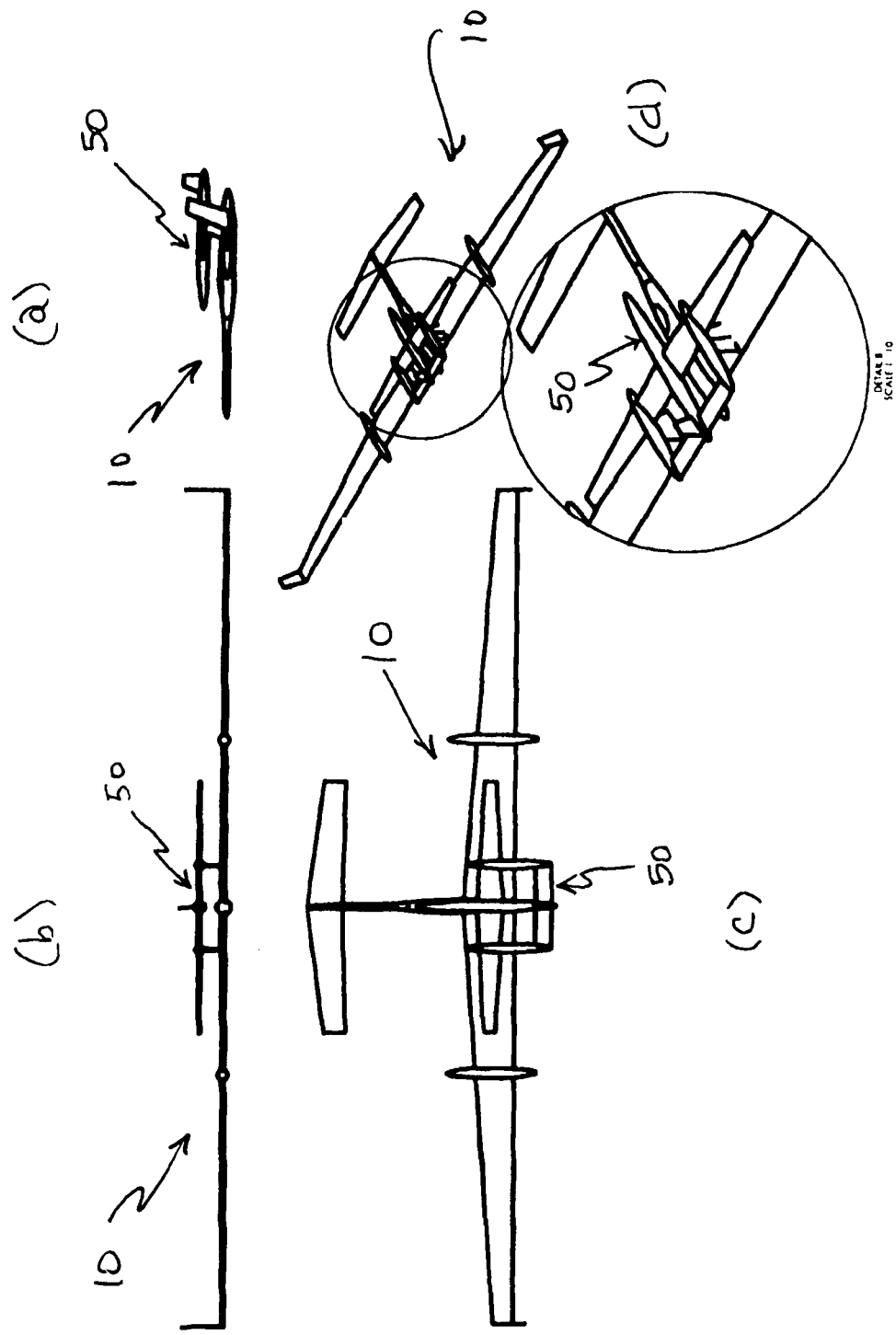
FIG. 4 illustrates a single UAV pack connected to the vertical stabilizer of a mothership, in accordance with another exemplary embodiment of the present invention.
Figure 5:
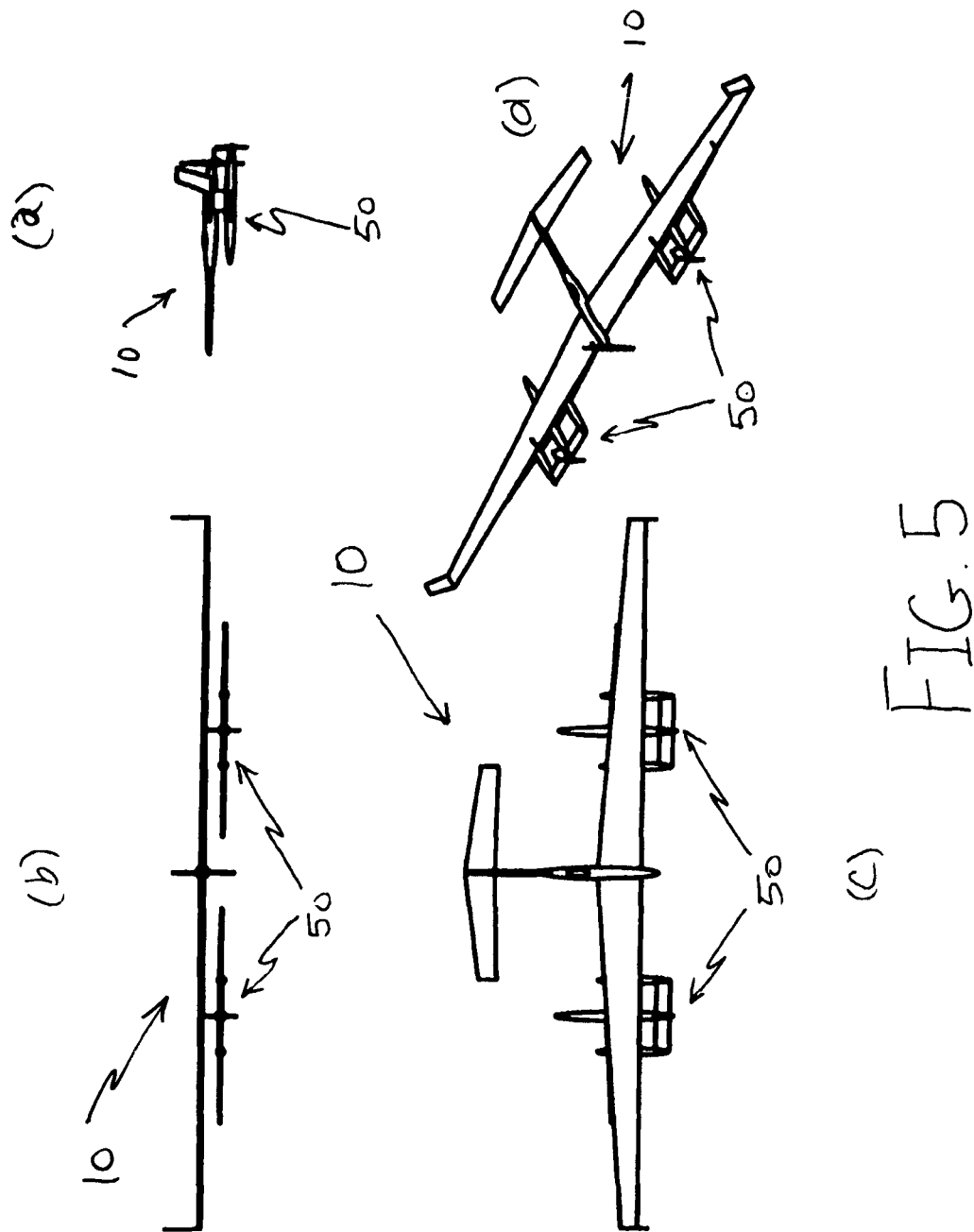
FIG. 5 illustrates two UAV packs connected under the fuselage of the mothership, in accordance with another exemplary embodiment of the present invention.
Figure 6:
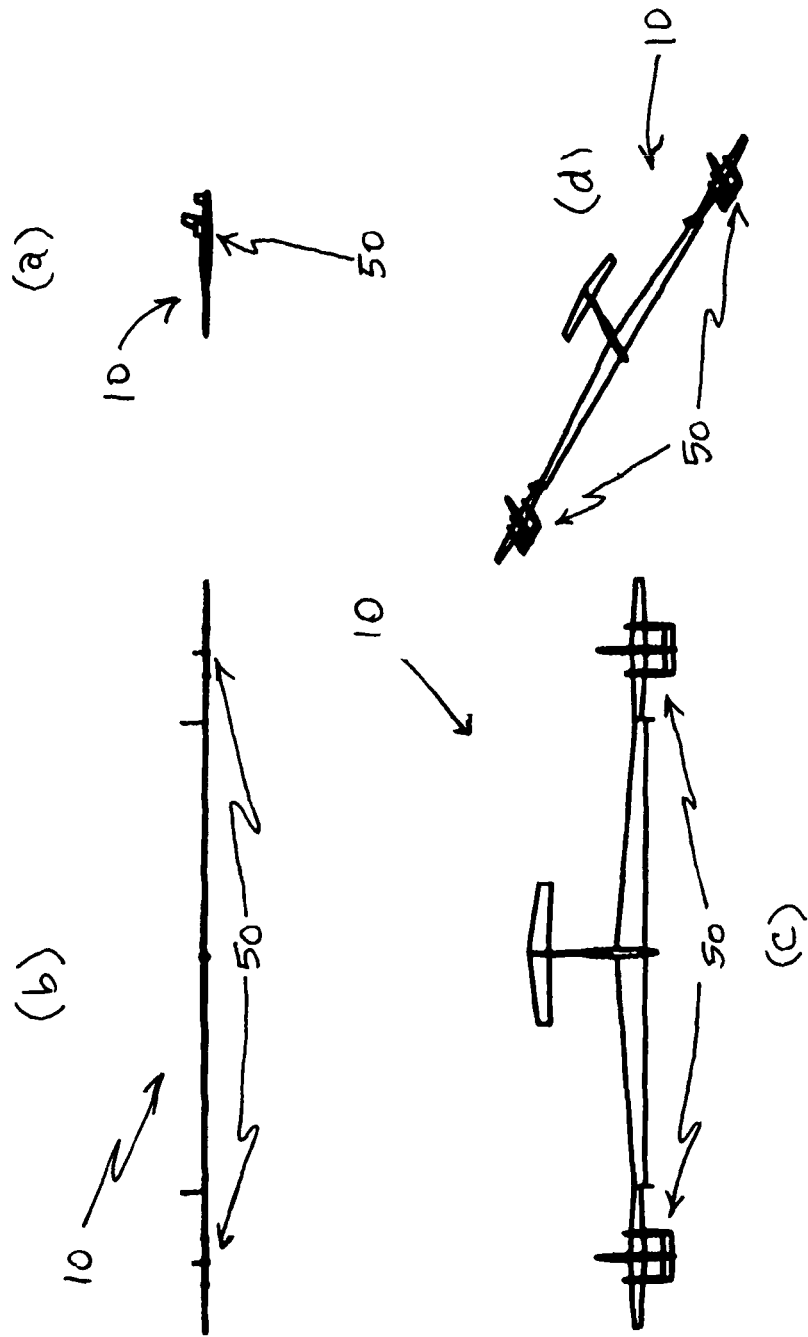
FIG. 6 illustrates each of two UAV packs connected to the tip of a corresponding one of the main wings of a mothership, in accordance with another exemplary embodiment of the present invention.

FIGS. 4-6 illustrate a number of exemplary configurations where a mothership 10, shown along its pitch (a), roll (b) and yaw (c) axes, and in perspective view (d), is connected to one or more UAV packs 50. In accordance with the second exemplary embodiment, the mothership 10 is capable of taking off with the one or more UAV packs 50. More specifically, FIG. 4 illustrates a single UAV pack 50 connected to the vertical stabilizer 30 or other such mounting and docking structure, not necessarily a flight control surface, of the mothership 10. In FIG. 5, two UAV packs 50 are connected under the mothership 10, for example, to the underside of fuselage 15. In FIG. 6, each of two UAV packs 50 are connected to the tip of a corresponding one of main wings 20. It will be understood, however, that other exemplary configurations involving UAV packs are possible.

If and when the mothership 10 determines that the electric charge associated with a UAV pack 50 is depleted, the mothership 10 may disconnect the UAV pack 50, electrically and mechanically, and jettison the UAV pack 50. The UAV pack 50 would then fly or glide to a location, for example, a predetermined land or sea based location. The flying or gliding of the jettisoned UAV pack may be accomplished by a preprogrammed autopilot on board the UAV to enable such autonomous flight, or by a remote pilot sending signals via remote control located either on the ground or in the mothership. Alternatively, it is feasible for the UAV packs to actually be manned, but this is not presently desirable due to cost and safety concerns, but may be desirable at some point in the future. Sea based locations may include ships, such as aircraft carriers, or fixed locations such as oil rig type platforms. The UAV Pack 50 could then be recharged for later reuse. Airborne or even space based collection, recharging and/or launch schemes could be used at potentially greater cost, however, for the purpose of the present description, the preferred embodiment is for ground and sea based collection centers to be established and utilized.

The UAV pack 50 may or may not employ its own propulsion system, such as an electric motor and propeller. If the UAV pack 50 does employ its own propulsion system, it could fly, independently under its own power, to the land or sea based collection center after being jettisoned by the mothership 10. If the UAV pack 50 does not employ its own propulsion system, the UAV pack 50 could be controlled, as previously described, so that it glides to one of the aforementioned locations after being jettisoned.

The second exemplary embodiment is, in some respects, similar to the first exemplary embodiment in that the mothership takes off with one or more UAV pack(s) and, therefore, a certain amount of electric charge to power the propulsion system of the mothership. In-flight, mothership 10 jettisons the UAV pack(s) as they are depleted of their electric charge. Releasing the UAV pack(s), one at a time, or more than one at a time, reduces the gross weight and increases the efficiency of the mothership 10, thereby increasing range, as previously explained.

If, similar to the exemplary configuration illustrated in FIG. 3, more than one UAV pack is employed, such that an even number of UAV packs are symmetrically positioned relative to the roll or longitudinal axis of the mothership 10, as illustrated in FIGS. 5-6, it is preferable, though it is not necessary that the mothership jettison the UAV packs in pairs. That is, it is preferable that the mothership jettison one UAV pack from one side of the roll or longitudinal axis, and another from the opposite side of the roll or longitudinal axis. As previously explained, releasing the UAV packs in this manner may prevent, or at least substantially reduce the likelihood of a resulting net force about the roll axis. Also, as previously explained, the jettison of one or more UAV packs may cause a change in the CG of the mothership 10, which can be compensated for by a coordinated movement of any remaining battery packs to center their remaining mass at the desirable CG point for the aircraft, or by trim adjustments in order to maintain level flight.

Further with regard to releasing a pair of UAV packs, it may actually be desirable to consume the battery packs of both UAVs at the same time so that they become depleted concurrently and are then jettisoned at the same time, as explained above. This concurrent draw down is accomplished by electrically wiring both packs together in parallel if they are each the desired full system voltage, or in series if each pack is configured as half of the desired full system voltage. However, in certain circumstances and designs, it also may be desirable to discharge the two packs sequentially and then jettison them together once both are depleted. However, in the latter case, this results in the mothership having to carry one depleted UAV pack as dead weight while the second UAV pack is consumed, which is not efficient but may be desirable in some cases. This is accomplished by consuming the UAV packs one after the other and not having them electrically connected together during use.

In a preferred embodiment, the mothership will have an onboard battery that serves as an additional energy source for the propulsion system, in addition to any releasable battery packs or UAV packs that may be employed to supplement the onboard battery. In this regard, the UAV packs may be configured and employed a number of different ways. For example, a UAV Pack may be configured such that it carries a higher voltage than the onboard battery. In this instance, the UAV pack may be used to rapidly charge the onboard battery which, as stated, serves as an additional and onboard energy source for the propulsion system. Alternately, the UAV Pack may be configured similar to the onboard battery, wherein the UAV pack may provide electricity directly to the propulsion system, essentially and/or effectively bypassing the onboard battery. In yet another alternative, the UAV Pack may be equipped with its own generation source, such as a turbine generator in place of, or in addition to, the UAV Pack's own battery. The use of a turbine generator can rapidly recharge the onboard battery pack and in certain cases, be jettisoned more rapidly than a battery-only UAV pack, thus reducing the drag and weight associated with the mothership flying a longer portion of its route while docked to a UAV pack.

Further, one of skill in the art will appreciate the fact that the wings associated with a UAV pack provide a clear benefit, even when the UAV pack is docked with the mothership. More specifically, the wings associated with a UAV pack provide additional lift to compensate for the additional weight of the corresponding UAV pack. As such, the surface area of the mothership's wings need not be increased to provide the additional lift necessary to accommodate the periodically docked UAV packs. This is important because a larger wing surface would lower the lift to drag ratio of the mothership which, in turn, decreases efficiency and range during times when no UAV packs are connected to the mothership.

In the first and second exemplary embodiments, range is extended by jettisoning or otherwise releasing one or more battery packs in-flight and one or more UAV packs in-flight, respectively. However, neither the first nor the second exemplary embodiments provide indefinite range capability. At some point, the electric charge associated with the battery packs and/or the UAV packs become depleted, thus limiting the range of the mothership. This issue is addressed by the third exemplary embodiment.

The third exemplary embodiment is similar to the second exemplary embodiment in that the electric charge associated with one or more UAV packs is used to extend the range of the mothership. However, unlike the second exemplary embodiment, the UAV packs takeoff from a ground or sea based location, and then rendezvous with and dock with the mothership in-flight. After the UAV pack docks with the mothership and is electrically connected, the UAV pack can be used, as described above, to rapidly recharge a battery onboard the mothership, provide electricity directly to the propulsion system of the mothership, or provide thrust for the mothership using its own propulsion system.

In accordance with the third exemplary embodiment, the mothership can, as previously described, jettison a UAV pack, when it is determined that the electric charge associated with the UAV pack is depleted. After doing so, a new UAV pack that has taken off and flown to a rendezvous point with the mothership can replace the charge depleted UAV pack, in-flight. By repeatedly jettisoning or otherwise releasing charge depleted UAV packs and replacing them with electrically charged UAV packs, in-flight, the range of the mothership can be extended indefinitely.

From an operations perspective, it is preferable that the electric charge associated with the mothership's onboard battery never be fully depleted. This would allow the mothership to continuously power the propulsion system, for example, during periods of transition after a charge depleted UAV pack has been jettisoned and while a new, charged UAV pack is preparing to dock with the mothership. To accomplish this, particularly during flight operations involving long or even indefinite range and/or duration, the UAV packs can be used to not only power the mothership's propulsion system, but also to recharge the mothership's onboard battery pack.

FIGS. 4-6, as stated above, illustrate a number of exemplary configurations where a mothership 10, shown along its pitch (a), roll (b) and yaw (c) axes, and in perspective view (d), is connected to one or more UAV packs 50. These figures equally apply to both the second and the third exemplary embodiments.

Figure 7:
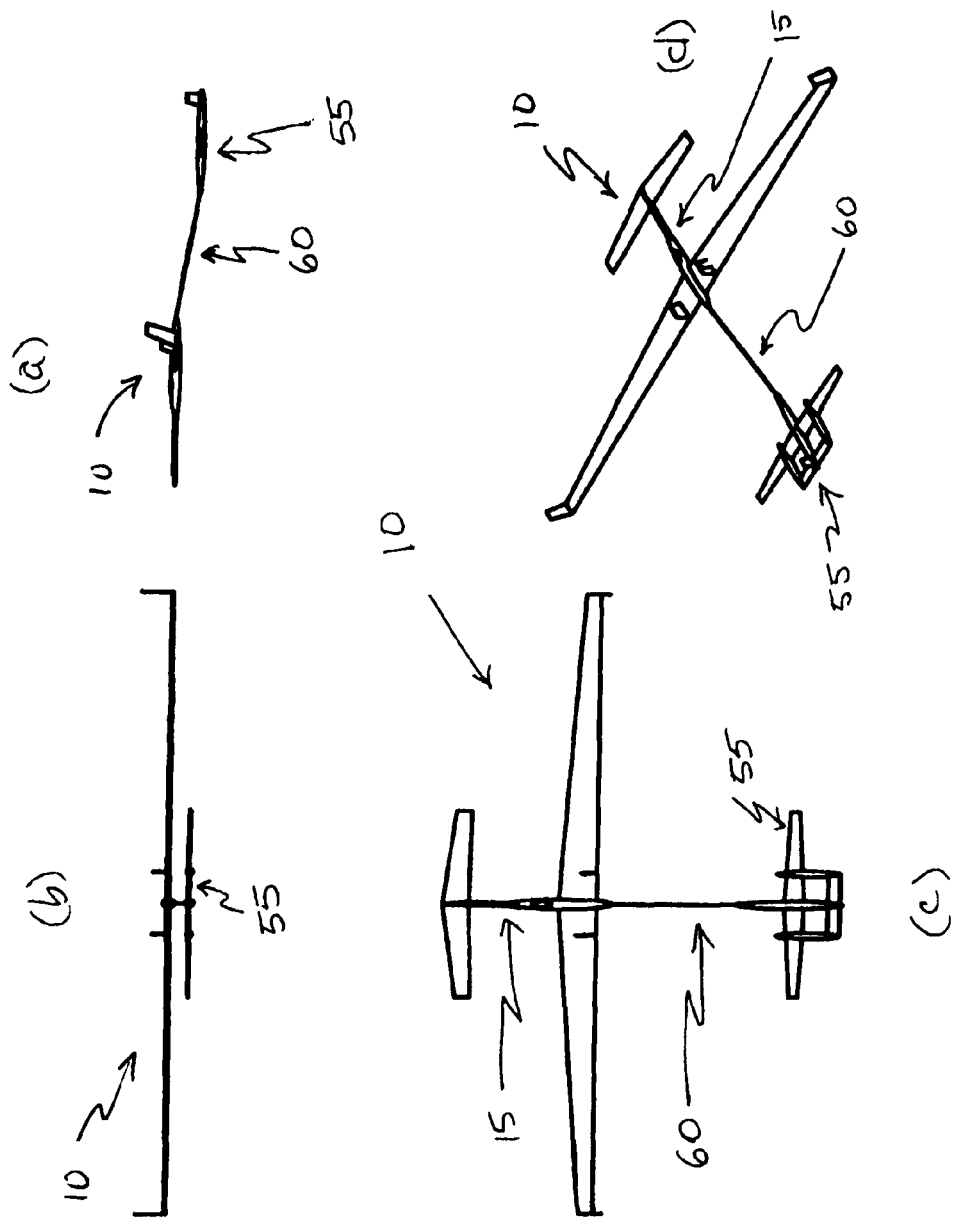
FIG. 7 illustrates a UAV pack connected to the mothership through an extendible cable, in accordance with yet another exemplary embodiment of the present invention.
Figure 8:
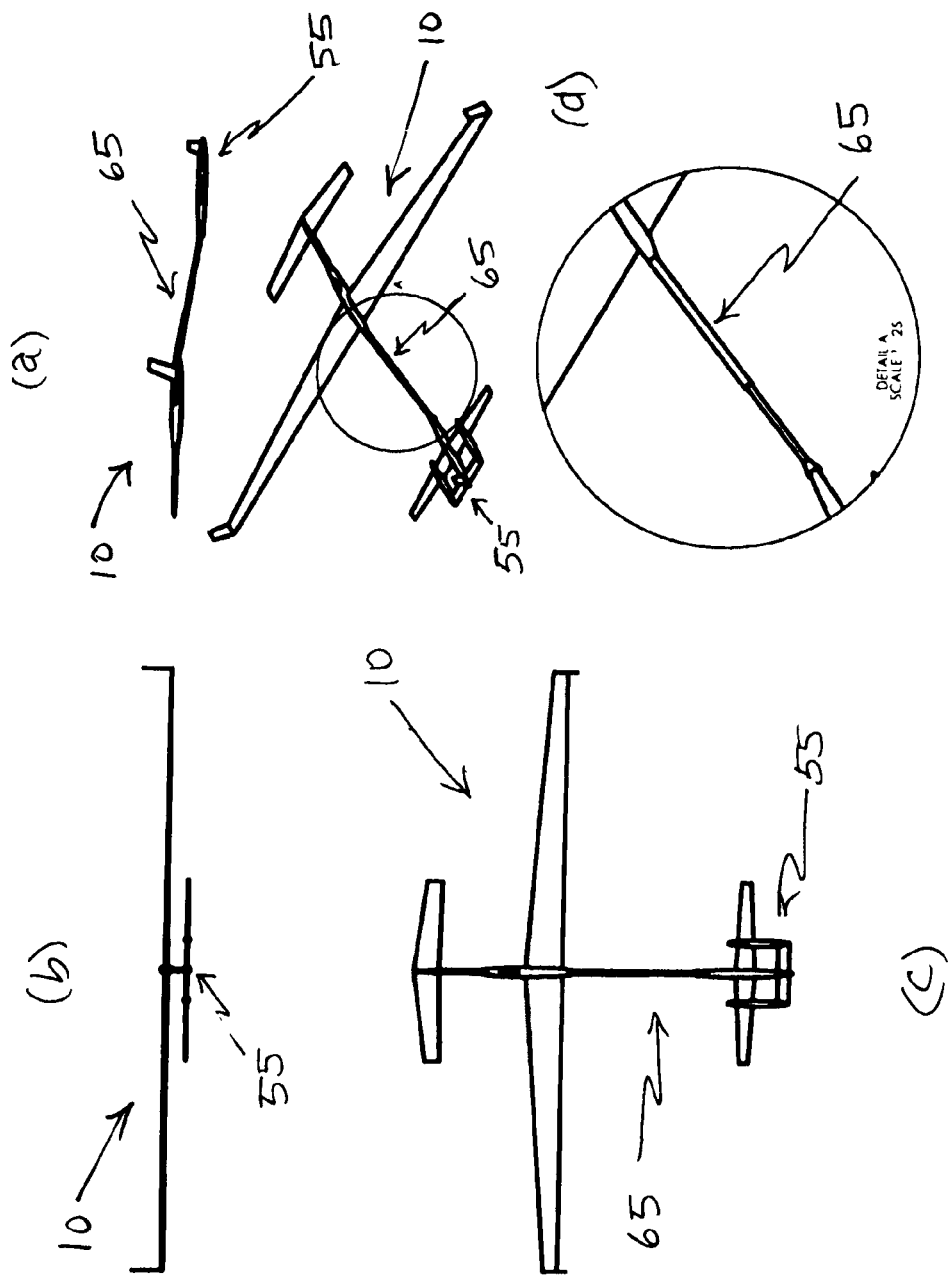
FIG. 8 illustrates a UAV pack connected to the mothership through an extendible boom, in accordance with yet another exemplary embodiment of the present invention.

FIGS. 7-8, however, illustrate two additional exemplary configurations, where a mothership 10, shown along its pitch (a), roll (b) and yaw (c) axes, and in perspective view (d), is connected to a UAV pack 55. These two additional exemplary configurations would more likely apply to the third exemplary embodiment, where UAV pack 55 takes off from a ground or sea based location and then flies to a rendezvous point and docks with the mothership 10 in order to provide electric charge to the mothership 10.

In FIG. 7, the UAV pack 55 connects to the mothership 10 through a cable 60. The mothership 10 may have the capability to reel in the cable after a charge depleted UAV pack 55 is jettisoned, and reel the cable out upon the arrival of a replacement UAV pack 55. It will be understood that the transfer of electric charge from the UAV pack 55 to the mothership 10 will occur through the cable 60. Alternatively, though not shown in the figures, a UAV pack 55 may deploy the cable and the mothership 10 may approach the UAV pack 55 from behind and position itself so that it can connect to the cable. After which time, the electric charge may be transferred from the UAV pack 55 to the mothership 10 through the cable.

When the mothership 10 and UAV pack 55 are connected via cable 60, a number of flight control strategies may be employed to prevent the two aircraft from contacting each other and to coordinate their uniform flight movements. In accordance with exemplary embodiments of the present invention, signals reflecting control inputs from the pilot of the mothership 10 are wireless sly transmitted to the control actuators of the UAV pack 55, which in turn, control the movement and/or positioning of corresponding UAV pack 55 flight control surfaces. Processing the signals that reflect the pilot control inputs may occur on the mothership's flight computer, after which, the processed signals are transmitted to the control actuators of the UAV pack 55. Alternatively, the signals that reflect the control inputs from the pilot of the mothership 10 may be transmitted to the UAV pack 55 and processed by the UAV pack 55 onboard flight computer before being transmitted to the control actuators of the UAV pack 55. For example, if the pilot of the mothership 10 commands the mothership 10 to bank left, corresponding signals will be wirelessly transmitted to the UAV pack 55 to control the UAV pack 55 to similarly bank left. Of course, if the UAV pack 55 deploys the cable 60, and the mothership 10 connects to the cable 60 from behind the UAV pack 55, as alternatively proposed above, the signals reflecting the pilot's control inputs would be similarly transmitted to the UAV pack 55, which is out in front of the mothership 10, wherein the UAV pack 55 would then execute the desired maneuver in advance of the mothership 10 in a coordinated fashion.

In addition to coordinating the flight movements between the mothership and the UAV pack, it is possible to also coordinate the propulsion of the two aircraft when the two are flying in close proximity to one another or flying while connected by cable. The cable connection between the UAV pack and the mothership must at least provide an electrical connection, but it does not necessarily have to provide a strong mechanical connection. This is because one propulsion strategy is to have the mothership sending velocity commands to the UAV pack, and by comparing speeds and/or measuring tension on the cable. For example, through the use of a strain gauge, it is possible for the trailing aircraft (either the mothership or the UAV pack) to provide just enough forward propulsion to keep a desired tension or amount of slack in the cable so that there is always an electrical connection, but the leading aircraft is not pulling, or towing the following aircraft. This strategy is desirable in that the two aircraft have some slack and additional freedom of movement relative to each other to prevent jerking on the cable or other forceful feedback that could be transmitted by either flying aircraft to the other. It is also possible for the cable to instead provide a strong mechanical connection in addition to the electrical connection between the two aircraft. In this way, the leading aircraft may partially or completely tow the following aircraft while electricity is flowing through the cable from the UAV pack to the mothership. Such a towing arrangement may be desirable in certain missions and routes of flight.

In FIG. 8, the UAV pack 55 connects to the mothership 10 through an extendible boom or telescopic arm 65. The mothership 10 may have the capability to withdraw the boom after a charge depleted UAV pack 55 is jettisoned, and extend the boom upon the arrival of a replacement UAV pack 55. It will be understood that the transfer of electric charge from the UAV pack 55 to the mothership 10 will occur through the extendible boom 65. Alternatively, though not shown in the figures, a UAV pack 55 may deploy the extendible boom and the mothership 10 may approach the UAV pack 55 from behind and position itself so that it can connect to the extendible boom. After which time, the electric charge may be transferred from the UAV pack 55 to the mothership 10 through the extendible boom.

A UAV pack, in accordance with the third exemplary embodiment, would likely be equipped with its own propulsion system such as an electric motor and propeller, a jet engine, a rocket motor, or the like, thus allowing the UAV pack to take off and fly, under its own power, to a rendezvous point with the mothership in order to dock with and recharge the mothership, as described above. For ease and safety of docking, the UAV pack, when docking with the mothership, should preferably be at a constant trajectory, altitude and speed. This is best achieved when the UAV pack does, in fact, employ its own propulsion system.

Nevertheless, it is possible that the UAV pack does not employ its own propulsion system. In this case, the UAV pack may be launched into the air by a catapult, slingshot, or other like devices. Alternately, a UAV pack may be lifted into the air, for example, through the use of a large balloon, a fixed-wing aircraft, helicopter, or by a rocket, to an altitude higher than the rendezvous and docking altitude. The UAV pack would then be dropped and allowed to free-fall until it executes a leveling off maneuver prior to the rendezvous and docking operation with the mothership. A drogue chute may be employed to stabilize the falling UAV pack, and to control descent speed at a predictable and safe velocity.

There are a number of techniques that could be employed to dock a UAV pack with the mothership. However, as suggested above, it is preferable that the UAV pack be flying along a steady trajectory and at a constant altitude and speed, as the mothership is flown into position to achieve docking. The act of docking may be controlled from or by the mothership, the UAV pack or a combination of both. It may be automated, manual or a combination of both. It may involve a pilot positioned in the mothership or a remotely located operator. It may involve optics, sensors, and other electromechanical, even magnetic devices, all of which, for the purpose of this disclosure, are known in the art. In fact, the mothership may be configured to fly up behind the UAV pack and execute the docking maneuver from a position behind the flying UAV pack. In this way, the pilot of a manned mothership may more easily see and control the docking from the rearward position.

Figure 9:
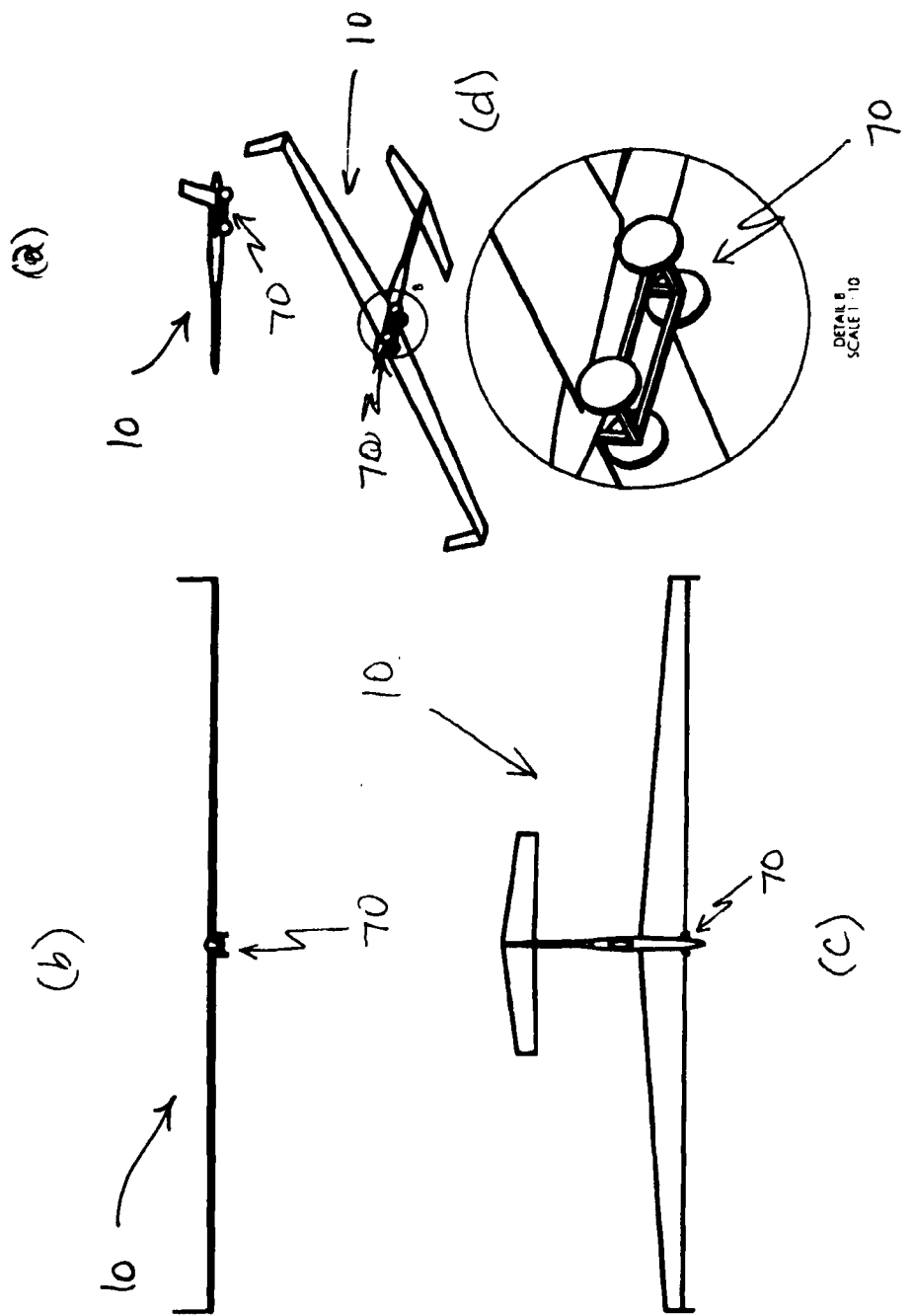
FIG. 9 illustrates a mothership connected to a takeoff cart, in accordance with another aspect of the present invention.

Aircraft expend a significant amount of energy during takeoff and climb out. Thus, in accordance with another aspect of the present invention, an optional takeoff assist cart may be employed. The takeoff assist cart would feature its own source of locomotion and connect to the underside of the mothership. The takeoff cart would propel the mothership, including its one or more battery packs and/or docked UAV Packs, down the runway until it reaches a safe takeoff speed. Upon liftoff, the mothership will separate from the takeoff cart, which remains on the ground, while the mothership, including its one or more battery packs and/or docked UAV packs, gains altitude and proceeds along its flight plan, and in accordance with any one or more of the first, second and/or third exemplary embodiments described above. The takeoff cart can be recovered and reused for a subsequent launch. FIG. 9 depicts a mothership 10 along its pitch (a), roll (b) and yaw (c) axes, and in perspective view (d), where the mothership 10 is connected to a takeoff cart 70. Another advantage of using a takeoff cart is the reduction of the weight of the landing gear structure of the mothership. In the preferred embodiment, the mothership is powered by rotating propellers. In certain designs, it is ideal for such propellers to be a large diameter. In order to clear the ground during takeoff, a tall landing gear apparatus would be required along with its associated weight and in-flight retraction mechanisms and structure. With electric airplane design, it is ideal to keep weight to a minimum and so a takeoff cart may obviate the need for a very tall landing gear apparatus to be installed. During landing operations, a much lower profile landing gear or series of small wheels on the underside of the mothership may emerge to provide a means for landing. The need for propeller clearance during landing is dispatched because electric motors can be commanded to very precise positions rotationally, and a method of commanding the electric motor(s) to "park" the propeller(s) in a horizontal and fixed position in the moments just before touchdown will allow the propellers to be hidden co-planar with the wing or cowling and stopped from rotating, thus enabling a low profile landing configuration.

The present invention has been described above in terms of a preferred embodiment and one or more alternative embodiments. Moreover, various aspects of the present invention have been described. One of ordinary skill in the art should not interpret the various aspects or embodiments as limiting in any way, but as exemplary. Clearly, other embodiments are well within the scope of the present invention. The scope the present invention will instead be determined by the appended claims.

We claim:

1. An in-flight charging method for an aircraft having an electrically powered propulsion system and at least one battery, said method comprising:
   establishing a wireless communication connection between the aircraft and an unmanned aerial vehicle (UAV) flying in proximity to the aircraft;
   transmitting, over the wireless communication connection, flight control input signals from the aircraft to the UAV, wherein the flight control input signals control the UAV's flight control surfaces;
   establishing an electrical connection between the aircraft and the UAV; and
   transferring electricity from an electricity source associated with the UAV to the aircraft through the electrical connection.

2. The method of claim 1, wherein establishing an electrical connection between the aircraft and the UAV comprises:
   extending one of a charging cable or a boom between the aircraft and the UAV, and wherein the electricity is transferred from the electricity source associated with the UAV to the aircraft through the charging cable or boom.

3. The method of claim 2, wherein extending the charging cable or boom between the aircraft and the UAV comprises:
   extending the charging cable or boom from the UAV to the aircraft, and wherein the aircraft is behind the UAV and the charging cable or boom becomes mechanically connected to the aircraft.

4. The method of claim 3, wherein the UAV tows the aircraft after the charging cable or boom becomes mechanically connected to the aircraft.

5. The method of claim 2, wherein extending the charging cable or boom between the aircraft and the UAV comprises:
   extending the charging cable or boom from the aircraft to the UAV, and wherein the UAV is behind the aircraft and the charging cable or boom becomes mechanically connected to the UAV.

6. The method of claim 1, wherein transferring electricity from the electricity source associated with the UAV to the aircraft comprises:
   transferring electricity to the aircraft propulsion system.

7. The method of claim 6, wherein transferring electricity from the electricity source associated with the UAV to the aircraft further comprises:
   transferring electricity to the at least one aircraft battery.

8. The method of claim 1, wherein the control input signals are transmitted to the UAV prior to and after the establishment of the electrical connection between the aircraft and the UAV, and wherein the control input signals reflect inputs pilot control inputs on the aircraft.

9. The method of claim 1, wherein establishing an electrical connection between the aircraft and the UAV comprises extending a charging cable between the aircraft and the UAV, and wherein the method further comprises:
   monitoring the tension on the charging cable; and
   maintaining a desired tension level on the charging cable by adjusting the forward propulsion of the aircraft, UAV or both.

10. The method of claim 9, wherein monitoring the tension on the charging cable comprises:
    determining the tension using a strain gauge.

11. The method of claim 9, wherein monitoring the tension on the charging cable comprises:
    determining and comparing the relative positions of the UAV and the aircraft.

12. The method of claim 11 further comprising:
    transmitting position information between the aircraft and the UAV over a wireless connection.

13. The method of claim 9, wherein monitoring the tension on the charging cable comprises:
    determining and comparing the relative speeds of the UAV and the aircraft.

14. The method of claim 13 further comprising:
    transmitting speed information between the aircraft and the UAV over a wireless connection.

15. The method of claim 1, wherein the control input signals are processed by a flight computer on the aircraft prior to transmission to the UAV.

16. The method of claim 1, wherein the control input signals are transmitted to actuators on the UAV which control the movement of the fight control surfaces on the UAV.

17. The method of claim 16, wherein the control input signals are received and processed by an flight computer onboard the UAV prior to being transmitted to the actuators.

* * * * *